United States Patent
Hamaguchi (10) Patent No.: US 11,865,756 B2
(45) Date of Patent: Jan. 9, 2024

(54) MOLD CLAMPING DEVICE OF INJECTION MOLDING MACHINE AND METHOD OF ADJUSTING MOLD THICKNESS OF MOLD CLAMPING DEVICE

(71) Applicant: SODICK CO., LTD., Kanagawa (JP)

(72) Inventor: Hiroki Hamaguchi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 505 days.

(21) Appl. No.: 17/113,120

(22) Filed: Dec. 7, 2020

(65) Prior Publication Data

US 2021/0170658 A1 Jun. 10, 2021

(30) Foreign Application Priority Data

Dec. 9, 2019 (JP) ................................. 2019-221872

(51) Int. Cl.
B29C 45/80 (2006.01)

(52) U.S. Cl.
CPC .... B29C 45/80 (2013.01); *B29C 2945/76096* (2013.01); *B29C 2945/76227* (2013.01); *B29C 2945/76391* (2013.01); *B29C 2945/76581* (2013.01); *B29C 2945/76709* (2013.01); *B29C 2945/76869* (2013.01)

(58) Field of Classification Search
None
See application file for complete search history.

(56) References Cited

U.S. PATENT DOCUMENTS

| 5,863,474 A | 1/1999 | Ito et al. |
| 6,439,875 B1 | 8/2002 | Morita et al. |

(Continued)

FOREIGN PATENT DOCUMENTS

| JP | H0435333 | 6/1992 |
| JP | H04369513 | 12/1992 |
| JP | H08276482 | 10/1996 |

(Continued)

OTHER PUBLICATIONS

Fujikawa JP2002160273A English Translation 2002 (Year: 2002).*
English translation of "Office Action of Japan Counterpart Application", dated Mar. 3, 2020, pp. 1-4.

*Primary Examiner* — Jacob T Minskey
*Assistant Examiner* — Adrien J Bernard
(74) *Attorney, Agent, or Firm* — JCIPRNET (57) ABSTRACT

A mold clamping device of an injection molding machine includes a mold clamping shaft fixed to a movable platen, a mold clamping ram to press the mold clamping shaft against a fixed platen, a ram position detecting member that detects a position of the mold clamping ram, an encoder detecting a position of the movable platen, a ram position control member that hydraulically controls a position of the mold clamping ram, a storage unit storing a difference value of mold closing positions of the movable platen before and after mold replacement, and a control unit. The control unit calculates the difference value when mold thickness adjustment is performed, calculates a movement position of the mold clamping ram based on a current position of the mold clamping ram and the difference value, moves the mold clamping ram to the movement position, and stops the mold clamping ram to perform mold clamping.

8 Claims, 10 Drawing Sheets

(56) References Cited

U.S. PATENT DOCUMENTS

| | | |
|---|---|---|
| 6,468,449 B1 | 10/2002 | Fujikawa |
| 2005/0218544 A1* | 10/2005 | Hakoda ................... B29C 45/80 |
| | | 264/40.5 |

FOREIGN PATENT DOCUMENTS

| | | |
|---|---|---|
| JP | H09193162 | 7/1997 |
| JP | 2001030322 | 2/2001 |
| JP | 2002160273 | 6/2002 |
| JP | 3892580 | 3/2007 |
| JP | 2011110700 | 6/2011 |
| JP | 5408780 | 2/2014 |

* cited by examiner

MOLD CLAMPING DEVICE OF INJECTION MOLDING MACHINE AND METHOD OF ADJUSTING MOLD THICKNESS OF MOLD CLAMPING DEVICE

CROSS-REFERENCE TO RELATED APPLICATION

This application claims the priority benefit of Japan Application No. 2019-221872, filed on Dec. 9, 2019. The entirety of the above-mentioned patent application is hereby incorporated by reference herein and made a part of this specification.

BACKGROUND

Technical Field

The disclosure relates to a mold clamping device of an injection molding machine and a method of adjusting a mold thickness of the mold clamping device, and particularly to a hybrid-type mold clamping device and a method of adjusting a mold thickness of the mold clamping device in which a mold opening/closing operation is electrically performed and a mold clamping operation is hydraulically performed.

Description of Related Art

Conventionally, in mold clamping devices of an injection molding machine, there is one having a configuration of being divided into a mold opening/closing drive device that performs a mold opening/closing operation and a mold clamping cylinder device that performs a mold clamping operation in order to reduce a time for a mold opening operation and a mold closing operation and generate a large mold clamping force in the mold clamping operation.

Japanese patent No. 3892580B2 discloses a mold clamping device of an injection molding machine which includes a fixed platen which is fixed on a machine base and to which a fixed mold is attached, a support platen coupled to the fixed platen by tie bars and supported to be slightly slidable with respect to the machine base, a movable platen to which a movable mold is attached and which moves between the fixed platen and the support platen, and a mold clamping shaft fixed to a rear surface of the movable platen. The mold clamping device further includes a mold opening/closing drive device constituted by an electric actuator such as a servomotor and a ball screw mechanism, and a mold clamping cylinder device constituted by a mold clamping cylinder, a mold clamping ram, a half nut, and the like. The mold clamping ram hydraulically presses the mold clamping shaft to perform mold clamping.

In such a so-called hybrid-type mold clamping device, immediately after power is supplied or when the mold is replaced, it is necessary to set the origin of the device for mold thickness adjustment.

An injection molding machine disclosed in U.S. Pat. No. 6,468,449B1 stores a position of a movable platen as an origin and sets the origin of the movable platen in a mold closed state in which the movable mold attached to a movable platen is moved forward and is brought into contact with a fixed mold attached to a fixed platen. Thereafter, the injection molding machine moves a mold clamping ram rearward to a rearward end position (machine limit position), stores the rearward end position of the mold clamping ram as an origin, and thus sets the origin of a mold clamping cylinder.

However, in order to actually perform a mold clamping operation for injecting and filling a molding material into the mold, the origin of the movable platen is set, the origin of the mold clamping cylinder is set thereafter, and it is further necessary to move the mold clamping ram forward from the rearward end position and search for an engagement portion between a convex part provided on a mold clamping shaft and a half nut using a detector such as an optical sensor to perform the mold clamping.

Conventionally, since it takes about 3 seconds to set the origin of the movable platen, about 7 to 12 seconds to set the origin of the mold clamping cylinder, and about 17 to 21 seconds to detect an engagement position of the half nut engaged with the convex part of the mold clamping shaft, it takes a long time for mold thickness adjustment before the mold clamping operation, and there have been many requests for reducing the time from workers who use such a mold clamping device.

Therefore, the disclosure provides a mold clamping device of an injection molding machine and a method of adjusting a mold thickness of the mold clamping device in which a time for mold thickness adjustment when the mold is replaced can be greatly reduced.

Further, the disclosure provides a mold clamping device of an injection molding machine and a method of adjusting a mold thickness of the mold clamping device in which an accurate engagement position of a half nut can be calculated even with a shortest time of mold thickness adjustment.

SUMMARY

The disclosure provides a mold clamping device of an injection molding machine in which a mold clamping shaft integrated with a mold opening/closing nut, the mold opening/closing nut is adapted to be moved by rotating a mold opening/closing screw shaft to perform opening and closing of a movable platen, a mold clamping ram incorporated in a support platen pressing the mold clamping shaft, the mold clamping ram hydraulically performing mold clamping of the movable platen, wherein the mold clamping shaft includes annular convex parts at a constant pitch on an outer circumference thereof, a half nut device incorporating a half nut which engages with the annular convex parts is coaxially attached to a distal end of the mold clamping ram, and the mold clamping shaft, the half nut device, and the mold clamping ram are disposed on one shaft, and the mold clamping device further includes a ram position detecting member which detects a position of the mold clamping ram, an encoder which detects a position of the movable platen, a ram position control member which hydraulically controls the position of the mold clamping ram, a storage unit which stores a difference value between mold closing positions of the movable platen before and after mold replacement, and a control unit which performs control of the mold clamping device, in which the control unit calculates the difference value when mold thickness adjustment is performed, calculates a movement position of the mold clamping ram on the basis of a current position of the mold clamping ram and the difference value, moves the mold clamping ram to the movement position, and then causes the half nut to engage with the mold clamping shaft to perform the mold clamping of the movable platen.

Also, the disclosure provides a method of adjusting a mold thickness of a mold clamping device in which opening and closing of a movable platen is performed by rotating a mold opening/closing screw shaft to move a mold opening/closing nut and moving a mold clamping shaft integrated with the mold opening/closing nut, and mold clamping of the movable platen is hydraulically performed by a mold clamping ram incorporated in a support platen pressing the mold clamping shaft, and the method of adjusting a mold thickness of a mold clamping device includes a difference value calculation step of calculating a difference value of mold closing positions of the movable platen before and after mold replacement, a movement position calculation step of calculating a movement position of the mold clamping ram on the basis of a current position of the mold clamping ram and the difference value, and a mold clamping step of performing mold clamping of the movable platen by engaging a half nut coaxially attached to a distal end of the mold clamping ram with the mold clamping shaft after the mold clamping ram is moved to the movement position.

According to the disclosure, since a difference value of mold closing positions of the movable platen is calculated and the mold clamping ram is moved on the basis of the difference value when the mold thickness adjustment is performed, a step of moving the mold clamping ram to a rearward limit each time the mold thickness is adjusted can be omitted, and a time for the mold thickness adjustment can be greatly reduced.

Further, according to the disclosure, since a difference value of mold closing positions of the movable platen is calculated and a mold thickness difference between the mold before mold replacement and the mold after the mold replacement is automatically calculated when the mold thickness adjustment is performed, work of manually inputting a mold thickness by an operator can be reduced, and an input error by the operator can be prevented.

The mold clamping device of an injection molding machine of the disclosure may further include a photoelectric detector provided in the half nut, in which, when a first mold thickness adjustment is performed after power is supplied to the mold clamping device, the control unit may move the mold clamping ram from a rearward limit, stop the mold clamping ram when the photoelectric detector detects that the annular convex parts have reached a position facing teeth of the half nut, and perform the mold clamping, and when the mold thickness adjustment is performed for a second time and subsequent times after power is supplied to the mold clamping device, the control unit may move the mold clamping ram to the movement position calculated on the basis of the difference value and then perform the mold clamping.

In the method of adjusting a mold thickness of a mold clamping device according to the disclosure, when a mold thickness is adjusted for a first time after power is supplied to the mold clamping device, the mold clamping ram may be moved from a rearward limit, the mold clamping ram may be stopped when it is detected that annular convex parts have reached a position facing teeth of the half nut, and the mold clamping may be performed, and when a mold thickness is adjusted for a second time and subsequent times after power is supplied to the mold clamping device, the mold clamping ram may be moved to the movement position calculated in the movement position calculation step and then the mold clamping may be performed.

According to the disclosure, at the time of the first mold thickness adjustment after power is supplied, since an engagement position of the annular convex parts engaged with the teeth of the half nut is detected by the photoelectric detector, and the mold clamping ram is moved with the engagement position as a reference when the mold is replaced thereafter, the engagement position of the half nut can be determined with higher accuracy than when only a difference value of mold thicknesses is detected to operate the mold clamping ram.

The mold clamping device of an injection molding machine of the disclosure may offset the movement position by a pitch of the annular convex parts when the movement position calculated by adding the current position of the mold clamping ram to the difference value does not fall within a range from a rearward limit position of the mold clamping ram to a forward limit position of the mold clamping ram.

Also, in the method of adjusting a mold thickness of a mold clamping device of the disclosure, the movement position calculation step may calculate a position that is offset from the movement position by a pitch of the annular convex parts as a new movement position when the movement position calculated by adding the current position of the mold clamping ram to the difference value does not fall within a range from a rearward limit position of the mold clamping ram to a forward limit position of the mold clamping ram.

According to the disclosure, when the movement position of the mold clamping ram calculated on the basis of the difference value of the mold thicknesses is outside a stroke range of the mold clamping ram, a new movement position that is offset from the original movement position by a pitch of the annular convex parts is calculated, and thereby the mold clamping ram can be moved to an appropriate engagement position with the half nut.

According to the disclosure, it is possible to provide a mold clamping device of an injection molding machine and a method of adjusting a mold thickness of the mold clamping device in which a mold thickness difference of molds before and after replacement is automatically calculated and the mold clamping ram is moved on the basis of the mold thickness difference when the mold is replaced, and thereby a time for mold thickness adjustment can be greatly reduced, and furthermore, an engagement position of the annular convex parts engaged with the teeth of the half nut is detected by the photoelectric detector, and thereby an accurate engagement position of the half nut can be calculated even with a shortest time of mold thickness adjustment.

DESCRIPTION OF THE EMBODIMENTS

Hereinafter, embodiments of the disclosure will be described with reference to the drawings. In the present specification, a moving direction of a mold clamping ram 51 is referred to as a front-rear direction, a direction in which the mold clamping ram 51 moves to a fixed platen 2 is forward, and an opposite direction thereof is rearward. Also, a direction from the mold clamping ram 51 to the fixed platen 2 is referred to as a positive direction, and an opposite direction thereof is referred to as a negative direction.

Figure 1:
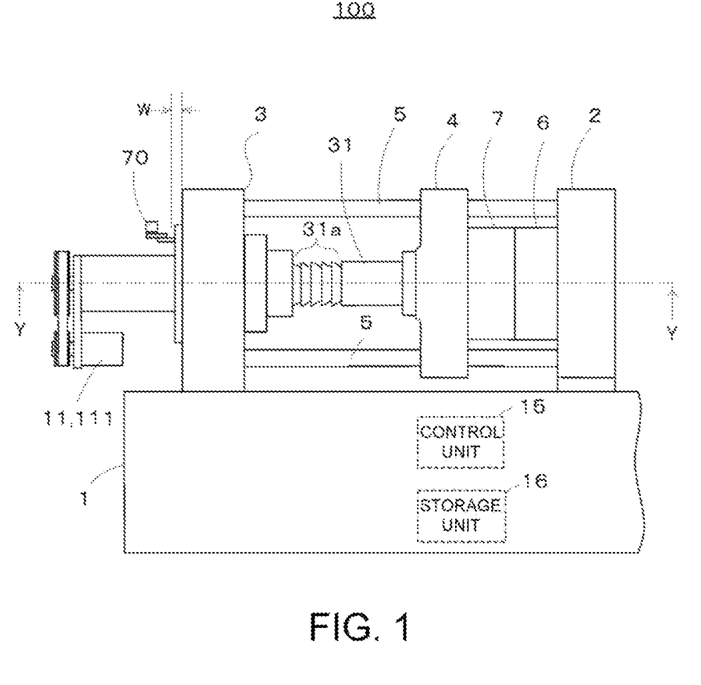
FIG. 1 is a side view illustrating a mold clamping device 100 according to an embodiment of the disclosure.

As illustrated in FIG. 1, the mold clamping device 100 includes the fixed platen 2 fixed to a machine base 1 and a support platen 3 slidable on the machine base 1. A movable platen 4 is movably supported along four tie bars 5 crossing between the fixed platen 2 and the support platen 3. A fixed mold 6 is attached to the fixed platen 2, and a movable mold 7 is attached to the movable platen 4. The movable platen 4 moves forward with respect to the fixed platen 2 to perform mold closing and moves rearward to perform mold opening. After the mold closing, the movable platen 4 is further pressed against the fixed platen 2 to perform mold clamping.

Figure 3:
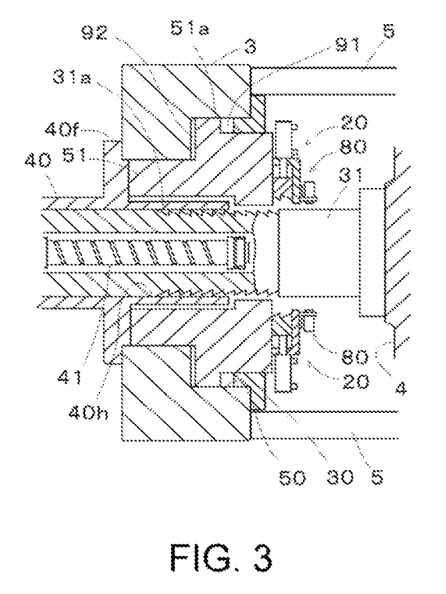
FIG. 3 is a cross-sectional view illustrating a structure of a half nut device 20 and its surroundings along line Y-Y of FIG. 1.

When a servomotor 11 fixed to the support platen 3 rotates a mold opening/closing screw shaft 41 to be described below, a mold clamping shaft 31 moves the movable platen 4 forward toward the fixed platen 2 to perform the mold closing. Then, the mold clamping ram 51 incorporated in the support platen 3 presses the movable platen 4 to the fixed platen 2 side via a half nut device 20 attached to a forward end of the mold clamping ram 51, and thereby the mold clamping is performed. As illustrated in FIG. 3, the mold clamping shaft 31, the half nut device 20, and the mold clamping ram 51 are coaxially disposed.

Next, the movable platen 4 moves rearward to perform the mold opening. At the time of the mold clamping, the tie bars 5 extend and the support platen 3 moves rearward by a mold clamping allowance W corresponding to a mold clamping force as in conventional cases. A ram position detecting member 70 to be described below is provided in the support platen 3, and a photoelectric detector 80 is provided in the half nut device 20.

Figure 2:
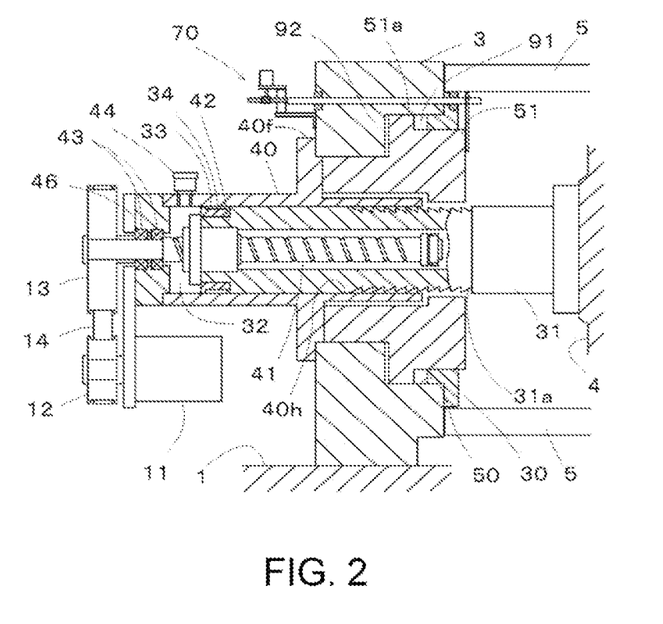
FIG. 2 is a longitudinal sectional view illustrating a main part of the mold clamping device 100 of FIG. 1 on a rear side with respect to a movable platen 4.

As illustrated in FIG. 2, a back-surface support member 40 having an extending part that extends in a front-rear direction in a cylindrical shape is formed is fixed to a rear surface of the support platen 3 by a flange part 40f thereof. On an inner side of the back-surface support member 40, an inner cylinder surface 40h is formed through the extending part in the front-rear direction. A pair of bearings 43 are housed in a rear end member 46 that closes a rear end of the back-surface support member 40, and the mold opening/closing screw shaft 41 is rotatably supported by the bearings 43. A ball screw is formed on an outermost circumference of the mold opening/closing screw shaft 41, and a pulley 13 is fixed to a shaft head at a rear end thereof. The servomotor 11 is fixed to a motor base attached to the rear end member 46. A pulley 12 is fixed to an output shaft of the servomotor 11. A timing belt 14 is stretched between the pulley 12 and the pulley 13. An encoder 111 is incorporated in the servomotor 11, and thereby a position in the front-rear direction of the movable platen 4 is detected, and a mold opening/closing operation is controlled.

The mold clamping shaft 31 is fixed to a rear surface of the movable platen 4 so that axial centers thereof coincide with each other, and annular convex parts 31a each having a triangular cross section are formed at a constant pitch on an outer circumference of the mold clamping shaft 31. A hollow hole is formed along the axial center of the mold clamping shaft 31, and a mold opening/closing nut 42 is fixed to a rear end thereof. The mold opening/closing nut 42 is a ball nut and is screwed onto the mold opening/closing screw shaft 41. In this way, a mold opening/closing mechanism is configured such that the mold opening/closing screw shaft 41 is coaxially and compactly housed in the hollow hole of the mold clamping shaft 31, and the mold clamping shaft 31 moves as the mold opening/closing screw shaft 41 rotates.

Also, a rear end member 33 is integrally attached to a rear end of the mold clamping shaft 31, and a slide bearing bush 34 is fitted therein. The rear end member 33 is housed to be movable in the inner cylinder surface 40h of the back-surface support member 40. In this way, when the mold is opened and closed, the mold clamping shaft 31 is configured to be guided by the inner cylinder surface 40h of the back-surface support member 40 and move. A predetermined amount of a lubricating oil is stored in a vacant chamber 32 surrounded by the inner cylinder surface 40h of the back-surface support member 40, the rear end member 46, the rear end member 33 of the mold clamping shaft 31, and the mold opening/closing nut 42. An air breather 44 is attached to a through hole opening in the back-surface support member 40 on a side above the vacant chamber 32 and configured such that air in the vacant chamber 32 comes in and out of the air breather 44 when a volume of the vacant chamber 32 changes according to opening and closing of the mold. In this way, an oil bath lubrication method is employed so that frictional resistance is reduced when the slide bearing bush 34 of the mold clamping shaft 31 slides.

A mold clamping cylinder hole 50 is formed in the support platen 3, and the mold clamping ram 51 is housed in the mold clamping cylinder hole 50 to be movable forward and rearward. A front surface support member 30 closes the mold clamping cylinder hole 50 to be liquid-sealed and supports the mold clamping ram 51 in a liquid-sealed state. A mold opening oil chamber 91 and a mold clamping oil chamber 92 are formed in front of and behind a piston part 51a of the mold clamping ram 51. A pressure oil is supplied to the mold opening oil chamber 91 and the mold clamping oil chamber 92 by a ram position control member 90 serving as a hydraulic control unit to be described below.

A control unit 15 in FIG. 1 performs control of the entire mold clamping device 100 and may be configured by, for example, a computer or a microcomputer having an arithmetic processing unit such as a central processing unit (CPU) and a memory. The control unit 15 performs control of the entire operation on the basis of a program stored in a storage unit 16 or an input signal from the outside.

The storage unit 16 may include, for example, a read-only memory (ROM), a random-access memory (RAM), a hard disk, or the like, and stores programs of various types and data.

Figure 4A:
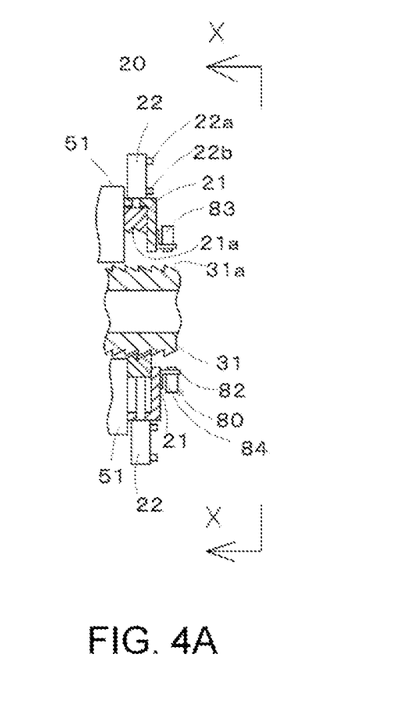
FIG. 4A is an enlarged cross-sectional view illustrating the half nut device 20 of FIG. 3.
Figure 4B:
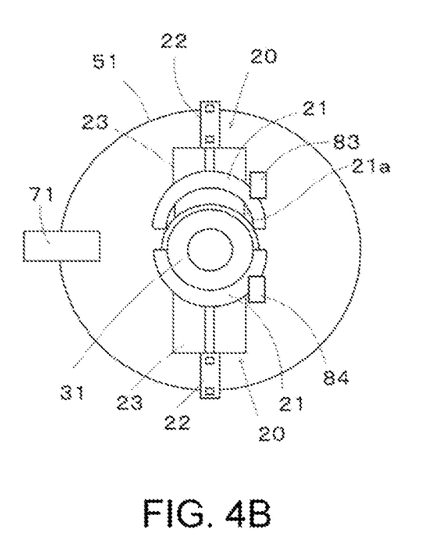
FIG. 4B is an enlarged view of the half nut device 20 of FIG. 3 along line X-X of FIG. 4A.

As illustrated in FIGS. 3, 4A, and 4B, the half nut device 20 is attached such that a center thereof coincides with a shaft center of the mold clamping shaft 31 and includes a pair of half nuts 21. The half nuts 21 are provided on both sides of the mold clamping shaft 31 and are guided by a guide rail 23. Air cylinders 22 and 22 are provided so that the half nuts 21 advance and retreat with respect to the mold clamping shaft 31, and rods thereof are coupled to the half nuts 21 and 21. A sensor 22b which detects that each of the half nuts 21 has advanced and engaged with the mold clamping shaft 31 and a sensor 22a which detects that each of the half nuts 21 has retreated and released the engagement with the mold clamping shaft 31 are attached to the air cylinders 22. Further, in order to help understanding, the half nut 21 illustrated on an upper side on the paper surface indicates a state in which it has retreated, and the half nut 21 illustrated on a lower side on the paper surface indicates a state in which it has advanced. As a matter of course, the half nuts 21 advance and retreat with respect to the mold clamping shaft 31 at the same time before and after a mold clamping operation. When they are implemented, the half nuts are preferably disposed to open and close laterally. This is because the air cylinders 22 disposed to face both side surfaces of the mold clamping device are convenient for maintenance.

Teeth 21a that engage with the annular convex parts 31a of the mold clamping shaft 31 described above are formed on an end surface of the half nut 21 facing the mold clamping shaft 31. The teeth 21a are formed over substantially a semi-circumference to be in contact and engage with the annular convex parts 31a in an area as large as possible. When the mold clamping force is significantly large, it is configured to be formed with three or more teeth. By doing as such, the mold clamping force is applied to the entire surface of engaged teeth faces of the annular convex parts 31a via the teeth 21a, and thereby wear of the half nut 21 and the mold clamping shaft 31 is made small. Also, since one mold clamping ram 51 presses one mold clamping shaft 31 coaxially in the mold clamping device 100 via one set of the half nuts 21 to perform the mold clamping, the mold clamping force is accurately and evenly applied to the movable platen 4.

The mold clamping device 100 further includes the photoelectric detector 80, the ram position detecting member 70, and the ram position control member 90.

Figure 7A:
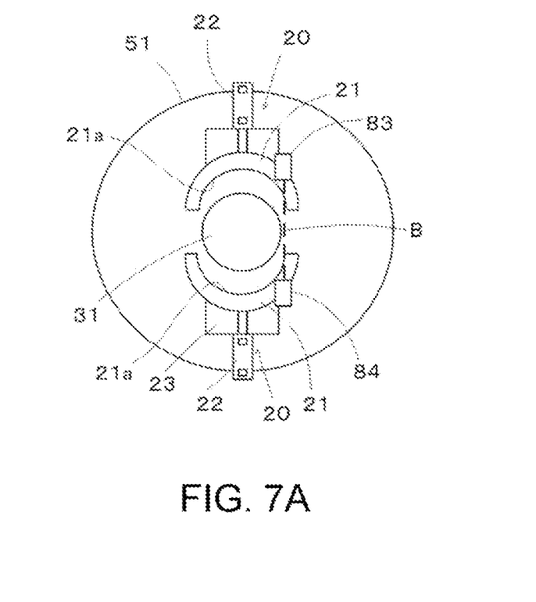
FIG. 7A is a schematic view illustrating a positional relationship between annular convex parts 31a, half nuts 21, and a detection optical axis B of a photoelectric detector 80 in a process in which mold thickness adjustment is performed in the mold clamping device 100 when the annular convex parts 31a do not block the detection optical axis B.
Figure 7B:
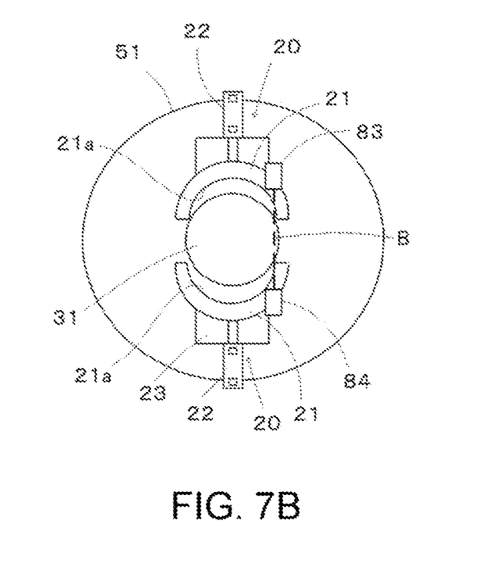
FIG. 7B is a schematic view illustrating a positional relationship between the annular convex parts 31a, the half nuts 21, and the detection optical axis B of the photoelectric detector 80 in a process in which mold thickness adjustment is performed in the mold clamping device 100 when the annular convex parts 31a block the detection optical axis B.

The photoelectric detector 80 detects that the annular convex parts 31a have approached to a predetermined position and is constituted by a light emitting element 83 that outputs light, a light receiving element 84 that detects light from the light emitting element 83, and a bracket 82. As illustrated in FIGS. 4A, 7A, and 7B, the light emitting element 83 and the light receiving element 84 are respectively disposed at front ends of circumferential edges of the teeth 21a of the half nuts 21 and 21.

The photoelectric detector 80 outputs light from the light emitting element 83 to the light receiving element 84 while the mold clamping ram 51 moves forward in mold thickness adjustment as will be described below and detects a position of the annular convex parts 31a of the mold clamping shaft 31. Specifically, when the mold clamping ram 51 moves forward with the half nuts 21 opened, positions of the annular convex parts 31a can be detected when corners of the annular convex parts 31a cross a detection optical axis B.

Figure 5:
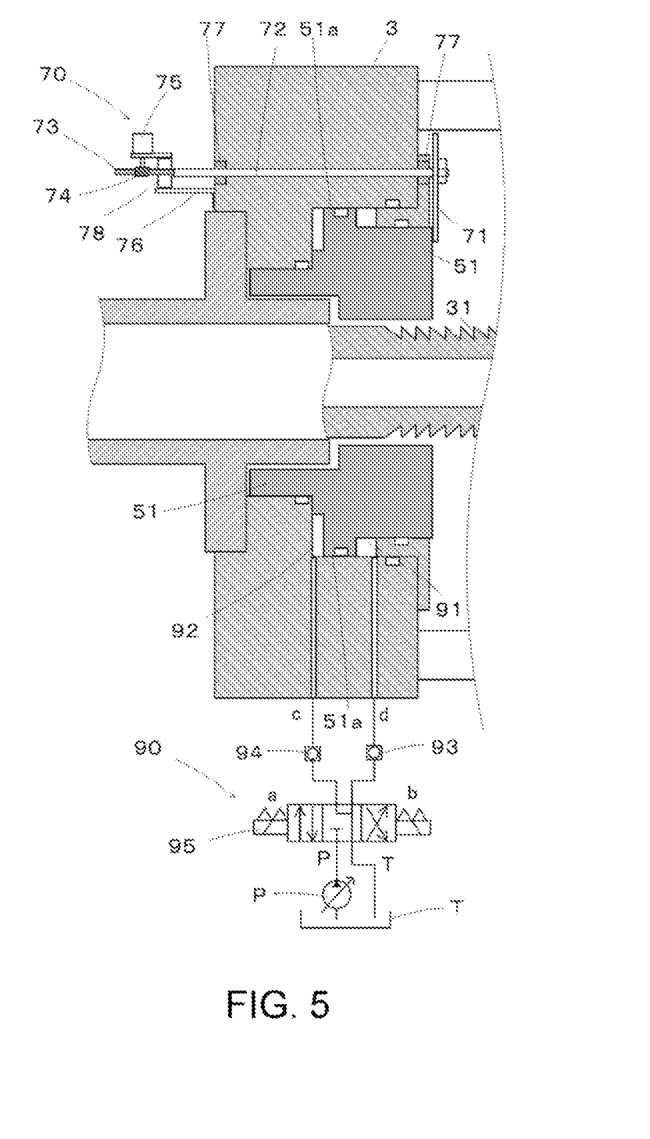
FIG. 5 is a schematic view illustrating a ram position detecting member 70 and a ram position control member 90 according to the embodiment of the disclosure.

As illustrated in FIG. 5, the ram position detecting member 70 is attached between the support platen 3 and the mold clamping ram 51. The ram position detecting member 70 is constituted by a rotary encoder 75 fixed to a back surface of the support platen 3 by a bracket 76, a pinion 74 fixed to a detection shaft of the rotary encoder 75, a connecting member 71 fixed to a front end surface of the mold clamping ram 51, an operating rod 72 connected to the connecting member 71 and attached to be movable back and forth through the support platen 3, and a rack 73 that is coaxially fixed to a distal end of the operating rod 72 and engages with the pinion 74. A position in the front-rear direction of the mold clamping ram 51 that moves forward and rearward with respect to the support platen 3, that is, a position in the front-rear direction of the half nut device 20 is detected by the ram position detecting member 70 using the rotary encoder 75 as a position in which the rack 73 moves forward and rearward. Further, reference sign 77 is a sliding bearing of the operating rod 72, and reference sign 78 is a bearing of the rack 73.

The ram position control member 90 is a member that moves the mold clamping ram 51 with respect to the support platen 3 using a hydraulic force and is connected to hydraulic lines c and d communicating with the mold opening oil chamber 91 and the mold clamping oil chamber 92 in the front and rear of the piston part 51a of the mold clamping ram 51. The ram position control member 90 is a hydraulic control unit including at least a directional control valve 95, a check valve 94 provided in the hydraulic line c, a check valve 93 provided in the hydraulic line d, a hydraulic pump P that supplies a hydraulic operating oil to the directional control valve 95, and a hydraulic tank T. Here, the hydraulic pump P is a pump capable of variably controlling a discharge pressure and a flow rate. Also, the directional control valve 95 is a four-port three-position switching valve of double solenoids a and b, and an intermediate position thereof is a control valve in which only a P port from the hydraulic pump P is blocked. Also, the check valves 93 and 94 are valves in which a check valve opens due to a pilot pressure from the outside, and a pilot piping is made so that hydraulic oils of the hydraulic lines c and d of the two check valves are supplied to each other as an external pilot pressure for the other check valve.

Control of moving a position of the mold clamping ram 51 with respect to the support platen by the ram position control member 90 configured as described above is performed as follows. When the mold clamping ram 51 is moved rearward, control of moving the mold clamping ram 51 rearward is performed by exciting the solenoid b of the directional control valve 95 and supplying the hydraulic oil to the mold opening oil chamber 91. At this time, the check valves 93 and 94 in the middle of the hydraulic lines hold the position of the mold clamping ram by storing a predetermined pressure oil in the mold opening oil chamber 91 and the mold clamping oil chamber 92. On the other hand, when the mold clamping ram 51 is moved forward, the control of moving the mold clamping ram 51 forward is performed by exciting the solenoid a of the directional control valve 95 and supplying the hydraulic oil to the mold clamping oil chamber 92.

Although a mold clamping operation and a depressurization operation are also controlled by the ram position control member 90, since a hydraulic valve required for controlling such an operation, for example, a valve for preventing a depressurization shock, is not changed from that of conventional cases, illustration and explanation are omitted.

Flow of First Mold Thickness Adjustment Step after Power is Supplied

A flow of a first mold thickness adjustment step performed for the first time after power is supplied to the mold clamping device 100 is different from a flow of a mold thickness adjustment step performed when the mold is replaced thereafter. Here, the flow of the first mold thickness adjustment step after power is supplied will be described with reference to FIG. 6.

Figure 6:
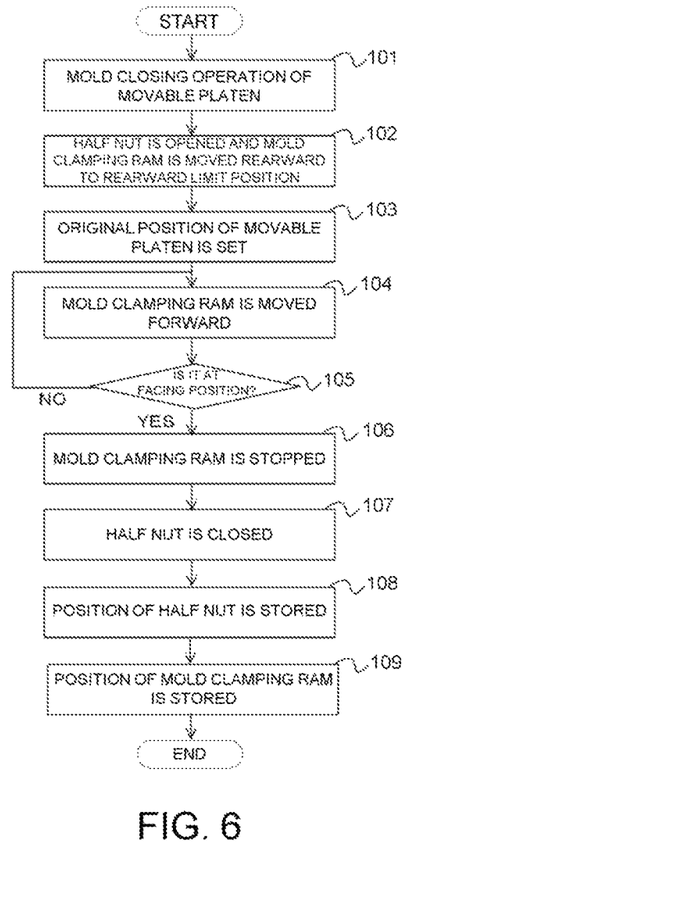
FIG. 6 is a flowchart showing a first mold thickness adjustment step of the mold clamping device 100 according to the embodiment of the disclosure after power is supplied.

When the mold thickness adjustment is performed for the first time after power is supplied, in step 101, a mold is attached to the fixed platen 2 and the movable platen 4, and the servomotor 11 is driven to perform a mold closing operation. Specifically, the control unit 15 drives the servomotor 11 fixed to the support platen 3 to rotate the mold opening/closing screw shaft 41 and move the mold clamping shaft 31 forward, and then the movable platen 4 moves forward toward the fixed platen 2 to perform the mold closing. In step 102, the control unit 15 excites the solenoid b of the directional control valve 95 to open the mold clamping oil chamber 92 to the hydraulic tank T side, and then a low-pressure hydraulic oil is supplied to the mold opening oil chamber 91 to move the mold clamping ram 51 rearward to a rearward limit position. When the mold clamping ram 51 is moved to the rearward limit position, in step 102, the half nuts 21 are opened by the air cylinders 22.

When the mold closing operation is completed, in step 103, the control unit 15 detects a current position $O_{P1}$ of the movable platen 4 in the front-rear direction using the encoder 111 incorporated in the servomotor 11 and stores the position in the storage unit 16 as an original position $O_{PL}$.

In step 104, the control unit 15 excites the solenoid a of the directional control valve 95 to supply a low-pressure and low flow rate hydraulic oil from the pump P to the mold clamping oil chamber 92 and opens the mold opening oil chamber 91 to the tank T side to move the mold clamping ram 51 forward slowly from the rearward limit position with a weak thrust.

In step 105, the control unit 15 detects a position of the annular convex parts 31a using the photoelectric detector 80. When the photoelectric detector 80 detects that the annular convex parts 31a have reached a position facing the teeth 21a of the half nuts 21, the processing proceeds to step 106, and the control unit 15 returns the directional control valve 95 to the intermediate position and stops the mold clamping ram 51 at that position. Otherwise, the processing returns to step 104.

Following step 106, the control unit 15 closes the half nuts 21 using the air cylinders 22 in step 107. In steps 108, the control unit 15 performs a mold clamping operation. After the mold clamping operation, in step 109, the position of the mold clamping ram 51 in the front-rear direction is detected by the rotary encoder 75 and is stored in the storage unit 16 as a current position $O_{KL}$ of the mold clamping ram 51.

Flow of Mold Thickness Adjustment Step When Mold is Replaced

After the first mold thickness adjustment after power is supplied is completed, the mold may be replaced in order to perform injection molding on another mold, in which case it is necessary to perform the mold thickness adjustment again. A flow of the mold thickness adjustment step in that case will be described below with reference to FIG. 8.

Figure 8:
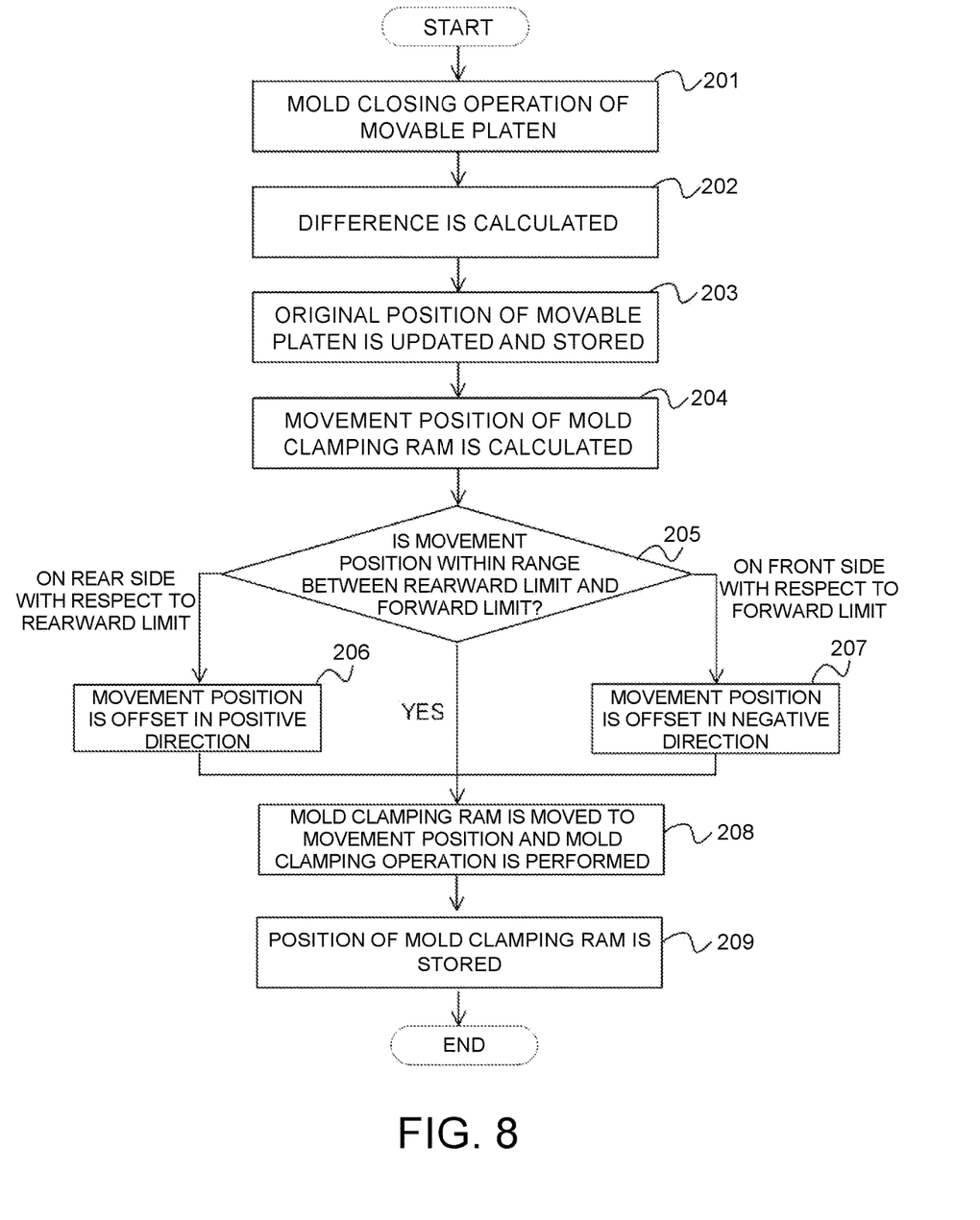
FIG. 8 is a flowchart showing a mold thickness adjustment step at the time of mold replacement performed by the mold clamping device 100 according to the embodiment of the disclosure.

At the time of mold replacement, a mold to be replaced is attached to the fixed platen 2 and the movable platen 4, and the control unit 15 drives the servomotor 11 to perform a mold closing operation in step 201. The control unit 15 drives the servomotor 11 fixed to the support platen 3 to rotate the mold opening/closing screw shaft 41, and thereby the mold clamping shaft 31 moves forward, and the movable platen 4 moves forward toward the fixed platen 2 to perform the mold closing.

When the mold closing operation is completed, a current position $O_{PT}$ of the movable platen 4 in the front-rear direction is detected by the encoder 111 incorporated in the servomotor 11. In step 202, the control unit 15 calculates $D_P$, which is a difference value between the original position $O_{PL}$ stored in the storage unit 16 and the current position $O_{PT}$ of the movable platen 4, using Math. 1 and stores it in the storage unit 16 (difference value calculation step).

$$D_P = O_{PT} - O_{PL} \quad (1)$$

$D_P$ is a difference in positions of the movable platen 4 in the front-rear direction caused when molds having different mold thicknesses are attached.

In step 203, the control unit 15 updates the current position $O_{PT}$ of the movable platen 4 to an original position $O_{PL}$ of the mold opening and closing as a new original position and stores it in the storage unit 16.

Next, in step 204, the control unit 15 calculates a position to which the mold clamping ram 51 moves. Specifically, a movement position $O_{KT1}$ of the mold clamping ram 51 is calculated from the current position $O_{KL}$ of the mold clamping ram 51 and the difference value $D_P$ using Math. 2 (movement position calculation step).

$$O_{KT1} = O_{KL} + D_P \quad (2)$$

In step 205, the control unit 15 determines whether or not the calculated movement position $O_{KT1}$ of the mold clamping ram 51 is between a rearward limit position $O_{KB}$ and a forward limit position $O_{KF}$ of the mold clamping ram 51. The rearward limit position $O_{KB}$ and the forward limit position $O_{KF}$ are stored in the storage unit 16 in advance, and the control unit 15 reads them for comparison with the movement position $O_{KT1}$.

When the movement position $O_{KT1}$ is between the rearward limit position $O_{KB}$ and the forward limit position $O_{KF}$ in step 205, in step 208, the control unit 15 moves the mold clamping ram 51 to the movement position $O_{KT1}$ of the mold clamping ram 51 calculated by Math. 2 to perform the mold clamping operation.

Specifically, the control unit 15 excites the solenoids a and b of the directional control valve 95 to supply a low-pressure hydraulic oil to the mold clamping oil chamber 92 or the mold opening oil chamber 91 and move the mold clamping ram 51 forward or rearward with respect to the movement position $O_{KT1}$. Thereafter, the mold clamping ram 51 is moved to the movement position $O_{KT1}$ by the ram position detecting member 70, the mold clamping ram 51 is stopped, and the half nuts 21 are opened to perform the mold clamping operation (mold clamping step).

When the movement position $O_{KT1}$ is positioned on a rear side with respect to the rearward limit position $O_{KB}$ in step 205, in step 206, the control unit 15 offsets the movement position $O_{KT1}$ forward by a pitch size $S_N$ of the annular convex parts 31a. Specifically, the control unit 15 reads the pitch size $S_N$ of the annular convex parts 31a stored in the storage unit 16 in advance, and offsets the movement position $O_{KT1}$ of the mold clamping ram 51 in the positive direction by one pitch interval of the annular convex parts 31a to be between the rearward limit position $O_{KB}$ and the forward limit position $O_{KF}$ as described in Math. 3. The control unit 15 sets the position as a new movement position $O_{KT2}$ of the mold clamping ram 51 (movement position calculation step). The processing proceeds to step 208 following step 206. Here, the control unit 15 moves the mold clamping ram 51 to the movement position $O_{KT2}$ of the mold clamping ram 51 and performs the mold clamping operation.

$$O_{KT2}=O_{KT1}+S_N \quad (3)$$

When the movement position $O_{KT1}$ is positioned on a front side with respect to the forward limit position $O_{KF}$ in step 205, in step 207, the control unit 15 offsets the movement position $O_{KT1}$ in the negative direction by the pitch size $S_N$ of the annular convex parts 31a. Specifically, the control unit 15 reads the pitch size $S_N$ of the annular convex parts 31a stored in the storage unit 16, and offsets the movement position $O_{KT1}$ of the mold clamping ram 51 in the negative direction by one pitch interval of the annular convex parts 31a so that the movement position $O_{KT1}$ of the mold clamping ram 51 falls between the rearward limit position $O_{KB}$ and the forward limit position $O_{KF}$ as described in Math. 4. The control unit 15 sets the position as a new movement position $O_{KT3}$ of the mold clamping ram 51 (movement position calculation step). The processing proceeds to step 208 following step 207. Here, the control unit 15 moves the mold clamping ram 51 to the movement position $O_{KT3}$ of the mold clamping ram 51 and performs the mold clamping operation.

$$O_{KT3}=O_{KT1}-S_N \quad (4)$$

After the mold clamping operation in step 208, in step 209, the control unit 15 stores the position of the mold clamping ram 51 detected by the rotary encoder 75 in the storage unit 16 as the current position $O_{KL}$ of the mold clamping ram 51.

As described above, in the mold thickness adjustment at the time of mold replacement, since a mold thickness difference of the molds between before and after the replacement is automatically calculated using a difference in the mold closing position of the movable platen 4 before and after the mold replacement, and the mold clamping ram 51 moves according to the mold thickness difference, a step of moving the mold clamping ram 51 rearward to the rearward limit and detecting the annular convex parts 31a of the mold clamping shaft 31 each time the mold is replaced can be omitted, and a time for the mold thickness adjustment can be reduced.

Also, at the time of the first mold thickness adjustment after power is supplied in the mold clamping device 100, since an engagement position of the annular convex parts 31a engaged with the teeth 21a of the half nuts 21 is detected by the photoelectric detector 80, and the mold clamping ram 51 is moved with the engagement position as a reference when the mold is replaced thereafter, the engagement position of the half nuts 21 can be determined with higher accuracy than with operation in which only a mold thickness difference is detected.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A mold clamping device of an injection molding machine comprising:
   a mold clamping shaft integrated with a mold opening/closing nut, the mold opening/closing nut is adapted to be moved by rotating a mold opening/closing screw shaft to perform opening and closing of a movable platen;
   a mold clamping ram incorporated in a support platen pressing the mold clamping shaft, the mold clamping ram hydraulically performing mold clamping of the movable platen, wherein
   the mold clamping shaft includes annular convex parts at a constant pitch on an outer circumference thereof,
   a half nut device incorporating a half nut which engages with the annular convex parts is coaxially attached to a distal end of the mold clamping ram, and
   the mold clamping shaft, the half nut device, and the mold clamping ram are disposed on one shaft,
   the mold clamping device further comprising:
   a ram position detecting member which detects a position of the mold clamping ram;
   an encoder which detects a position of the movable platen;
   a ram position control member which hydraulically controls the position of the mold clamping ram;
   a storage unit which stores a difference value between a first mold closing position of the movable platen for a first mold, and a second mold closing position of the movable platen for a second mold; and
   a control unit which performs is control of the mold clamping device, wherein
   the control unit calculates the difference value when mold thickness adjustment is performed, calculates a movement position of the mold clamping ram on the basis of a current position of the mold clamping ram and the difference value, moves the mold clamping ram to the movement position, and then causes the half nut to engage with the mold clamping shaft to perform the mold clamping of the movable platen.

2. The mold clamping device of an injection molding machine according to claim 1, wherein
   the mold clamping device further includes a photoelectric detector provided in the half nut,
   when a first mold thickness adjustment is performed after power is supplied to the mold clamping device, the control unit moves the mold clamping ram from a rearward limit, stops the mold clamping ram when the photoelectric detector detects that the annular convex parts have reached a position facing teeth of the half nut, and performs the mold clamping, and
   when the mold thickness adjustment is performed for a second time and subsequent times after power is supplied to the mold clamping device, the control unit moves the mold clamping ram to the movement position calculated on the basis of the difference value and then performs the mold clamping.

3. The mold clamping device of an injection molding machine according to claim 1, wherein the mold clamping device offsets the movement position by a pitch of the annular convex parts when the movement position calculated by adding the current position of the mold clamping ram to the difference value does not fall within a range from a rearward limit position of the mold clamping ram to a forward limit position of the mold clamping ram.

4. The mold clamping device of an injection molding machine according to claim 2, wherein the mold clamping device offsets the movement position by a pitch of the annular convex parts when the movement position calculated by adding the current position of the mold clamping ram to the difference value does not fall within a range from a rearward limit position of the mold clamping ram to a forward limit position of the mold clamping ram.

5. A method of adjusting a mold thickness of a mold clamping device in which opening and closing of a movable platen is performed by rotating a mold opening/closing screw shaft to move a mold opening/closing nut and moving a mold clamping shaft integrated with the mold opening/closing nut, and mold clamping of the movable platen is hydraulically performed by a mold clamping ram incorporated in a support platen pressing the mold clamping shaft, the method of adjusting a mold thickness of a mold clamping device comprising:

a difference value calculation step of calculating a difference value of a first mold closing position of the movable platen for a first mold, and a second mold closing position of the movable platen for a second mold;

a movement position calculation step of calculating a movement position of the mold clamping ram on the basis of a current position of the mold clamping ram and the difference value; and a mold clamping step of performing mold clamping of the movable platen by engaging a half nut coaxially attached to a distal end of the mold clamping ram with the mold clamping shaft after the mold clamping ram is moved to the movement position.

6. The method of adjusting a mold thickness of a mold clamping device according to claim 5, wherein, when a mold thickness is adjusted for a first time after power is supplied to the mold clamping device, the mold clamping ram is moved from a rearward limit, the mold clamping ram is stopped when it is detected that annular convex parts formed on an outer circumference of the mold clamping shaft have reached a position facing teeth of the half nut, and the mold clamping is performed, and when a mold thickness is adjusted for a second time and subsequent times after power is supplied to the mold clamping device, the mold clamping ram is moved to the movement position calculated in the movement position calculation step and then the mold clamping is performed.

7. The method of adjusting a mold thickness of a mold clamping device according to claim 5, wherein the movement position calculation step calculates a position that is offset from the movement position by a pitch of the annular convex parts as a new movement position when the movement position calculated by adding the current position of the mold clamping ram to the difference value does not fall within a range from a rearward limit position of the mold clamping ram to a forward limit position of the mold clamping ram.

8. The method of adjusting a mold thickness of a mold clamping device according to claim 6, wherein the movement position calculation step calculates a position that is offset from the movement position by a pitch of the annular convex parts as a new movement position when the movement position calculated by adding the current position of the mold clamping ram to the difference value does not fall within a range from a rearward limit position of the mold clamping ram to a forward limit position of the mold clamping ram.

* * * * *